United States Patent
Weisse et al.

(10) Patent No.: US 10,823,190 B2
(45) Date of Patent: Nov. 3, 2020

(54) FAN BLADE WITH VARIABLE THICKNESS COMPOSITE COVER

(71) Applicant: UNITED TECHNOLOGIES CORPORATION, Farmington, CT (US)

(72) Inventors: Michael A. Weisse, Tolland, CT (US); Kwan Hui, East Hartford, CT (US); Larry Foster, South Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 268 days.

(21) Appl. No.: 14/597,692

(22) Filed: Jan. 15, 2015

(65) Prior Publication Data

US 2015/0198173 A1    Jul. 16, 2015

Related U.S. Application Data

(60) Provisional application No. 61/928,169, filed on Jan. 16, 2014.

(51) Int. Cl.
*F04D 29/32* (2006.01)
*F04D 19/00* (2006.01)
(Continued)

(52) U.S. Cl.
CPC ............ *F04D 29/324* (2013.01); *B32B 37/18* (2013.01); *B32B 38/0004* (2013.01); *F01D 5/147* (2013.01); *F01D 5/282* (2013.01); *F04D 19/002* (2013.01); *B32B 2603/00* (2013.01); *F05D 2220/36* (2013.01); *F05D 2300/603* (2013.01); *Y02T 50/672* (2013.01); *Y02T 50/673* (2013.01); *Y10T 156/1052* (2015.01)

(58) Field of Classification Search
CPC .. F04D 29/324; F04D 19/002; F05D 2220/36; F05D 2300/603; F05D 2230/60; F05D 2240/12; F05D 2300/43; F05D 2300/502; F01D 9/041; F01D 5/147; F01D 5/282; F01D 5/14; B32B 37/18; B32B 38/0004; B32B 2603/00
USPC ...................................................... 416/229 R
See application file for complete search history.

(56) References Cited

U.S. PATENT DOCUMENTS 3,368,795 A * 2/1968 Bolin ...................... F01D 5/16
                                                        29/889.71
4,472,866 A * 9/1984 Moracz ................... B23P 15/04
                                                        228/182
(Continued)

FOREIGN PATENT DOCUMENTS

EP          2 006 487 A1   12/2008
WO     WO 2014/13741 A1    9/2014

OTHER PUBLICATIONS

European Search Report for related European Application No. 15 15 0987; report dated May 15, 2015.

*Primary Examiner* — Aaron R Eastman
(74) *Attorney, Agent, or Firm* — Cantor Colburn LLP

(57) ABSTRACT

A fan blade having an opening on one side exposing one or more cavities, and a composite cover that fits over the opening, is provided. The composite cover has a variable thickness resulting from the layering of cover plies having different shapes, and is designed to achieve a lightweight fan blade having an optimal level of stiffness.

15 Claims, 4 Drawing Sheets

(51) Int. Cl.
*B32B 37/18* (2006.01)
*B32B 38/00* (2006.01)
*F01D 5/14* (2006.01)
*F01D 5/28* (2006.01)

(56) References Cited

U.S. PATENT DOCUMENTS

| | | | | |
|---|---|---|---|---|
| 5,279,892 | A * | 1/1994 | Baldwin | B29C 70/08 416/230 |
| 5,375,978 | A * | 12/1994 | Evans | B64C 11/26 416/224 |
| 5,634,771 | A * | 6/1997 | Howard | F01D 5/147 416/229 R |
| 8,585,368 | B2 | 11/2013 | Viens et al. | |
| 8,807,925 | B2 * | 8/2014 | McKaveney | F01D 5/147 415/119 |
| 8,944,773 | B2 * | 2/2015 | Weisse | F01D 5/147 416/229 R |
| 2007/0065291 | A1 * | 3/2007 | Karafillis | F01D 5/16 416/224 |
| 2009/0053070 | A1 * | 2/2009 | Schilling | F01D 5/147 416/93 R |
| 2011/0129348 | A1 * | 6/2011 | Parkin | B29D 99/0025 416/230 |
| 2011/0211965 | A1 * | 9/2011 | Deal | F01D 5/147 416/223 R |
| 2012/0034089 | A1 * | 2/2012 | Wadewitz | B29C 70/24 416/223 R |
| 2012/0163983 | A1 | 6/2012 | Barlow et al. | |
| 2013/0039774 | A1 * | 2/2013 | Viens | F01D 5/147 416/226 |
| 2016/0201480 | A1 * | 7/2016 | Foster | F04D 29/023 415/200 |
| 2016/0215789 | A1 * | 7/2016 | Hui | F04D 29/023 |
| 2016/0252104 | A1 * | 9/2016 | Hui | F01D 5/147 |

* cited by examiner

FAN BLADE WITH VARIABLE THICKNESS COMPOSITE COVER

CROSS-REFERENCE TO RELATED APPLICATION

This Application is a non-provisional patent application claiming priority under 35 CSC § 119(e) to U.S. Provisional Patent Application Ser. No. 61/928,169 filed on Jan. 16, 2014.

FIELD OF THE DISCLOSURE

Disclosed herein are fan blades for turbofan gas turbine engines. In one example, a disclosed fan blade may include a metallic body having an opening communicating with one or more hollow cavities on a suction side of the fan blade for weight reduction and a composite cover that encloses the hollow cavities. The cover comprises multiple plies and is configured to give the cover more compliance around the fan blade edges especially near the outer span, where the blade deflections are highest after bird impact, while minimizing the impact to blade stiffness by keeping the cover thick near the lower span, where deflections are also lower. This reduces the likelihood of cover delamination or disbonding following bird impact, which would compromise the engine's ability to meet run-on thrust requirements following a bird impact event.

BACKGROUND OF THE DISCLOSURE

Gas turbine engines, such as those used on jet aircraft, generally comprise an air intake port, a fan mounted on a hub near the air intake port and surrounded by a fan case, a low pressure compressor (LPC) section, an intermediate section aft of the LPC section, a high pressure compressor (HPC) section, a combustion chamber or combustor, high and low pressure turbines that provide rotational power to the compressor blades and fan respectively, and an exhaust outlet. The fan and LPC section may be operably connected to the low pressure turbine by an inner drive shaft which rotates about an engine center axis. A cone-like spinner may be mounted over the hub forward the fan blades to help guide air flow.

Some sections of the engine include airfoil assemblies comprising airfoils (typically blades or vanes) mounted at one or both ends to an annular endwall. Included among these sections is the fan section in which fan blades drive air flow into the engine core.

Weight reduction in gas turbine engines used for aircraft results in fuel savings. One known means for reducing the weight of a gas turbine engine is to include hollow cavities in some of the components that do not need to be solid metal to meet structural requirements. One such component is the fan blade.

Some fan blades comprise a metallic body made of titanium or aluminum or other metallic materials with an opening located on the non-flow path, convex side of the fan blade, also known as the suction side of the fan blade, wherein the opening communicates with recesses or cavities. The opposite side of the fan blade is the concave or pressure side. The opening is covered by a cover.

A constant thickness cover can lower fan blade stiffness because the mass and thickness are evenly distributed throughout the cover. Metallic fan blades can be tapered to reduce mass near the fan blade edges. However, there is a limit to how tapered (thin) the edges of the fan blade can be because the fan blade must be reasonably stiff to withstand foreign object events such as bird impacts.

One of the reasons for the stiffness exhibited by diffusion bonded fan blades is that the blade walls can be tapered. However, diffusion bonded fan blades are expensive to make.

The present disclosure addresses these problems by providing a metallic fan blade body and a variable thickness lightweight fan blade cover to achieve a fan blade having an optimal level of stiffness.

SUMMARY OF THE DISCLOSURE

The disclosure relates to a fan blade for a turbofan jet engine, the fan blade having a body and a cover. The body has a pressure side and a suction side adjoining the pressure side along a fan blade leading edge and a fan blade trailing edge. The suction side defines an opening which exposes one or more cavities formed in the fan blade body. The cover is configured to fit over the opening and comprises a cover leading edge and a cover trailing edge which generally align with the fan blade leading edge and the fan blade trailing edge respectively.

In one aspect of the disclosure the cover comprises multiple plies in which some of the plies have sizes and perimeters different than those of other plies to create a cover having a varying thickness. The multiple plies may comprise at least one inner ply interposed between one or more top plies and one or more bottom plies.

The number of inner plies may be greater than one, wherein each inner ply has a perimeter and the perimeters are not all co-extensive (i.e. the same).

The top and bottom plies preferably have perimeters that are substantially co-extensive with the perimeter of the opening in the fan blade body.

The cover preferably bends in synchronization with the body. The cover may be thinnest near the cover leading edge and the cover top edge. In other words, the cover may be most flexible near the cover leading edge and the cover top edge.

The cover defines a cover area, and the inner plies may extend over only a portion of the cover area while the top and bottom plies may extend over the entire cover area.

The multiple plies that make up the cover may be made of composite material layered up and cured together.

In another aspect of the disclosure a method for fabricating a fan blade is provided. The method may comprise the steps of:

manufacturing a body including a pressure side and a suction side, the pressure side and the suction side being disposed between and connected to a fan blade leading edge and a fan blade trailing edge, one of the pressure side or the suction side including an opening exposing one or more cavities;

providing a cover configured to fit over the opening, the cover comprising a cover leading edge and a cover trailing edge which generally align with the fan blade leading edge and the fan blade trailing edge respectively, the cover further comprising one or more inner plies interposed between one or more top plies and one or more bottom plies, wherein the inner plies have varying perimeters and varying shapes; and covering the opening with the cover.

The method may comprise the additional steps of:
positioning the one or more inner plies between the one or more top plies and the one or more bottom plies to create a layered structure;
curing the layered structure to create cured structure; and machining the cured structure to a desired shape and finish to create the cover.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PREFERRED EMBODIMENTS

In the disclosure that follows certain relative positional terms are used such as "forward", "aft", "upper", "lower", "above", "below", "inner", "outer" and the like. These terms are used with reference to the normal operational attitude of a jet engine and should not be considered otherwise limiting. The forward end of a jet engine generally refers to the air intake port end and the aft end generally refers to the exhaust end. When referring to a fan blade, the "leading edge" generally means the edge upstream of the air flow, and the "trailing edge" generally means the edge downstream of the air flow. Finally, "radially outward" generally refers to a direction away from the engine center axis while "radially inward" refers to a direction toward the engine center axis.

Figure 1:
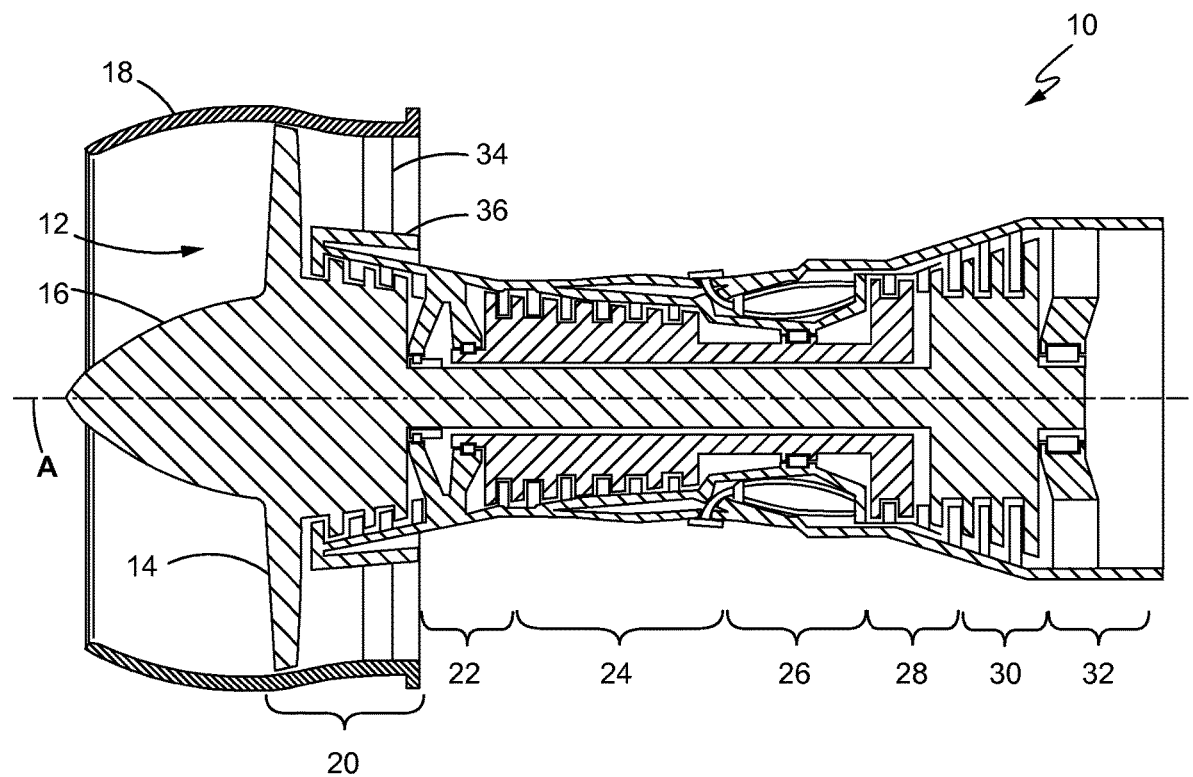
FIG. 1 is a longitudinal cross-sectional view of a gas turbine engine in which fan blades according to the present disclosure might be used.

FIG. 1 is a longitudinal sectional view of an exemplary turbofan jet engine 10 that may be equipped with fan blades according to the present disclosure. The engine 10 comprises an air intake port 12, fan blades 14 mounted on a hub 15 near the air intake port 12 and surrounded by a fan case 18 which is mounted within an engine housing or nacelle (not shown), a low pressure compressor (LPC) section 20, a bearing support section 22 aft of the LPC section 20, a high pressure compressor (HPC) section 24, a combustion chamber or combustor 26, a high pressure turbine 28 that provides rotational power to the HPC 24, a low pressure turbine 30 that provides rotational power to the LPC 20 and fan blades 14, and an exhaust outlet 32, all centered around an engine axis (A). A substantially conical spinner 16 (cap and body) is mounted over the hub forward the fan blades 14 to help guide air flow.

Figure 2:
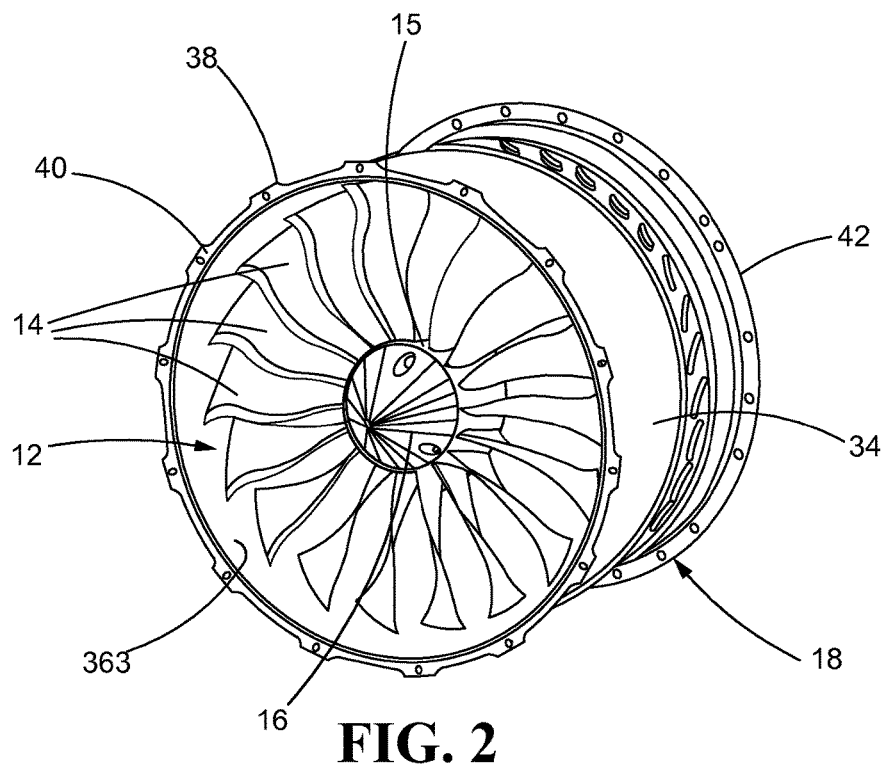
FIG. 2 is an enlarged view of a portion of the gas turbine engine of FIG. 1.

FIG. 2 is an enlarged view of a portion of the gas turbine engine 10 of FIG. 1, including the fan case 18 that surrounds the fan blades 14. The fan case 18 may include a hollow body 34, an abradable liner 36 disposed inside the hollow body 34, a forward flange 38 on the hollow body 34 defining a surface 40 for mating to a forward part of the nacelle (not shown), and a rear flange 42 for mating to an aft part of the nacelle (also not shown). The abradable liner 36 circumscribes the fan blades 14 which are coupled to the hub 15. The fan blades 14 extend radially outward from the annular hub 15.

Figure 3:
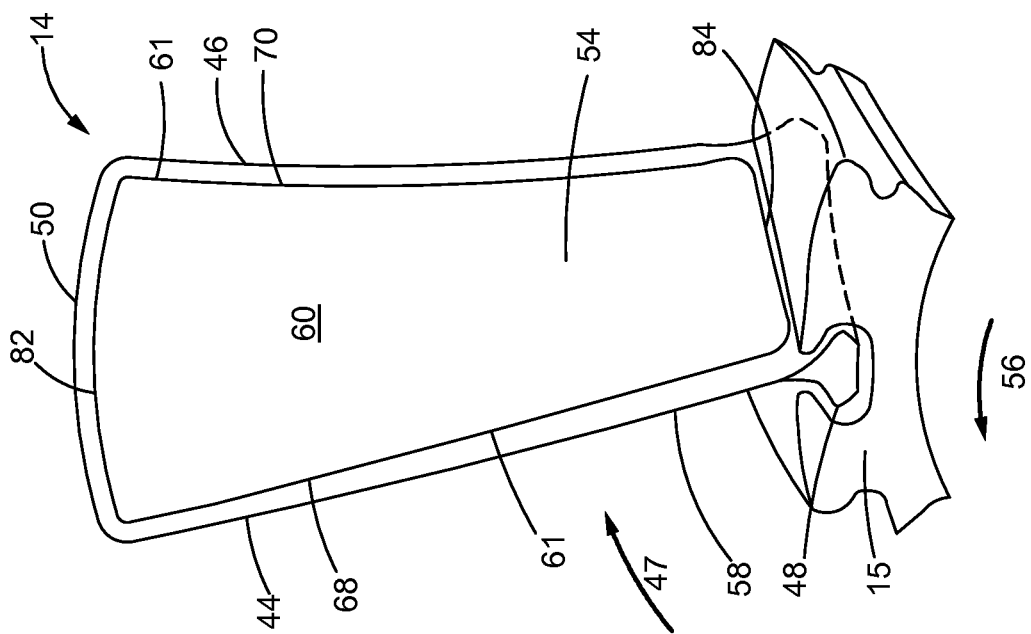
FIG. 3 is a perspective view of a single fan blade.

FIG. 3 is a perspective view of a single fan blade 14 coupled to the hub 15. The fan blade 14 includes a leading edge 44 and a trailing edge 46 with respect to the airflow direction as indicated by arrow 47. The fan blade 14 comprises a root 48 attached to the hub 15 and extends radially outward to a free tip 50. The fan blade 14 has a generally concave pressure side 52 and a generally convex suction side 54 joined together at the respective leading and trailing edges 44, 46. The fan blade 14 rotates in a rotational direction as illustrated by arrow 56. The pressure side 52 and the suction side 54 of the fan blade 14 are aerodynamically configured for maximizing the efficiency of air compression and achieving a desired pressure ratio.

It will be noted that fan blades for gas turbine engines may be provided in the variety of sizes, shapes and styles. The fan blades shown in the figures are but mere examples and are not intended to limit the disclosure. Further, the disclosed fan blade designs may be adapted for use in other types of jet engines, propellers, rotors, etc.

Still referring to FIG. 3, the fan blade 14 may include a body 58 and a cover 60. The body 58 typically is fabricated from titanium, a titanium alloy, aluminum, aluminum alloy or other suitable structural material(s) that will be apparent to those skilled in the art.

The cover 60 may be fabricated from multiple plies of a fiber/resin composite material such as carbon fiber reinforced polymer (CFRP) and/or glass fiber reinforced polymer (GFRP). A protective layer or coating may be applied over the composite cover 60 (not apparent in the figure), and may be made from an elastomer such as a fluoropolymer elastomer like VITON® fluoroelastomer. The cover 60 has a cover leading edge 68 and a cover trailing edge 70 corresponding to the fan blade leading edge 44 and fan blade trailing edge 46. The cover also has a top edge 82 and a bottom edge 84. The cover 60 has a perimeter 61 and, as explained in more detail with regard to FIGS. 5 and 6, may be made of multiple plies of composite material layered up and cured together in any suitable manner.

Figure 4:
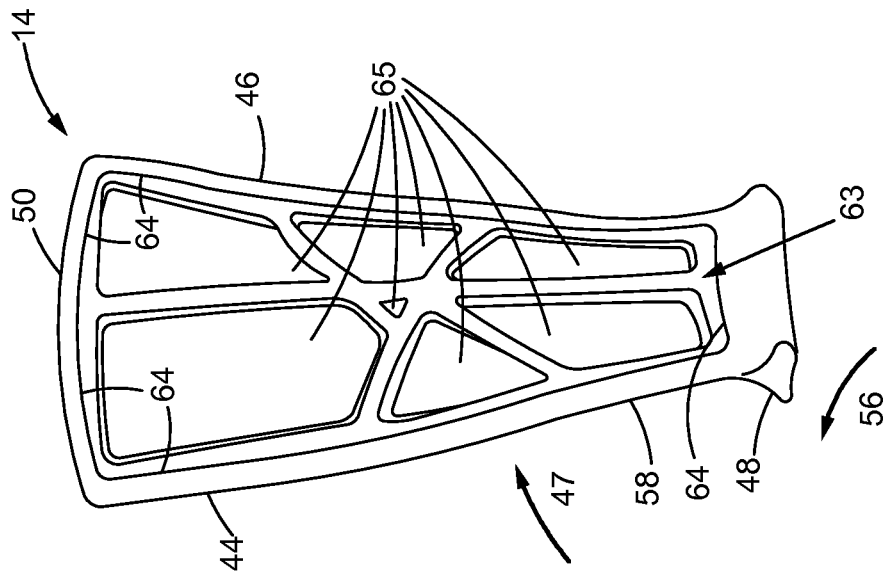
FIG. 4 is perspective view of the fan blade of FIG. 3 with the cover removed.

FIG. 4 is a perspective view of the fan blade 14 of FIG. 3 without the cover 60. To reduce the weight of the fan blade 14, one or more cavities 65 may be formed on the pressure side 52 or, preferably, on the suction side 54 of the fan blade 14. The cavities 65 communicate with an opening 63 in the fan blade body 58. The opening has a perimeter 64. The cover 60 is positioned over the opening 63 and may be secured thereto in any suitable manner, for example, with adhesive bonding, to provide a smooth surface for air flow 47 along the suction side 54 of the fan blade 14.

Figure 5:
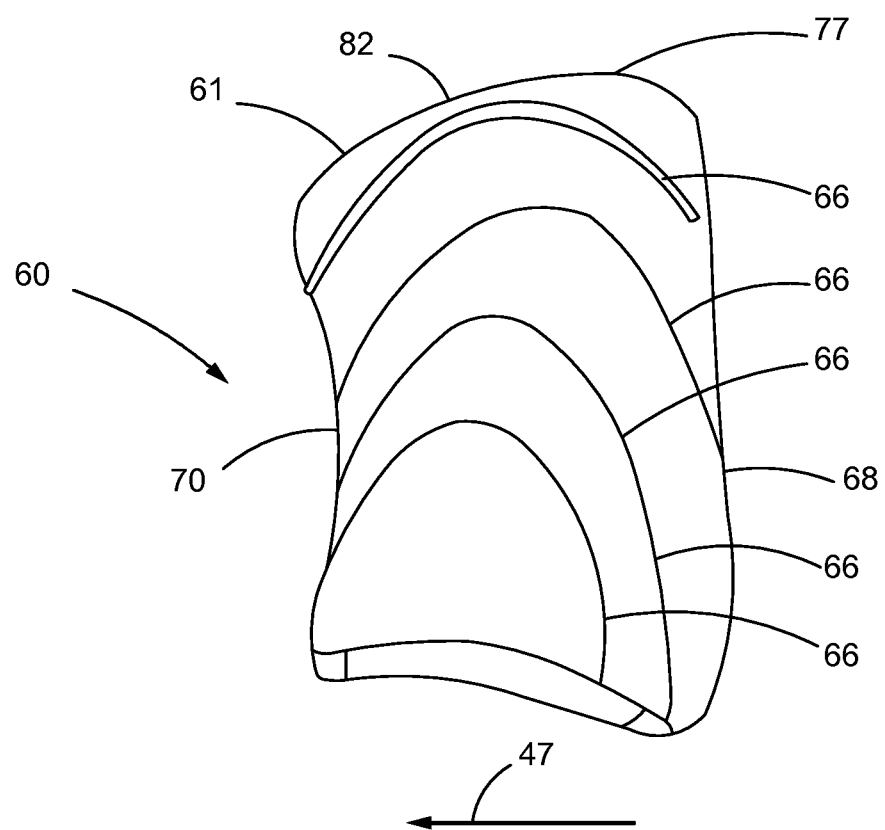
FIG. 5 is a partial perspective view of the cover of FIG. 4.

FIG. 5 is a partial perspective view of the cover 60 of FIG. 3 with topographical lines 66 to illustrate variations in cover thickness. The thickness variations may be the result of multiple composite plies of varying shapes being positioned and bonded together to form the cover 60.

Figure 6:
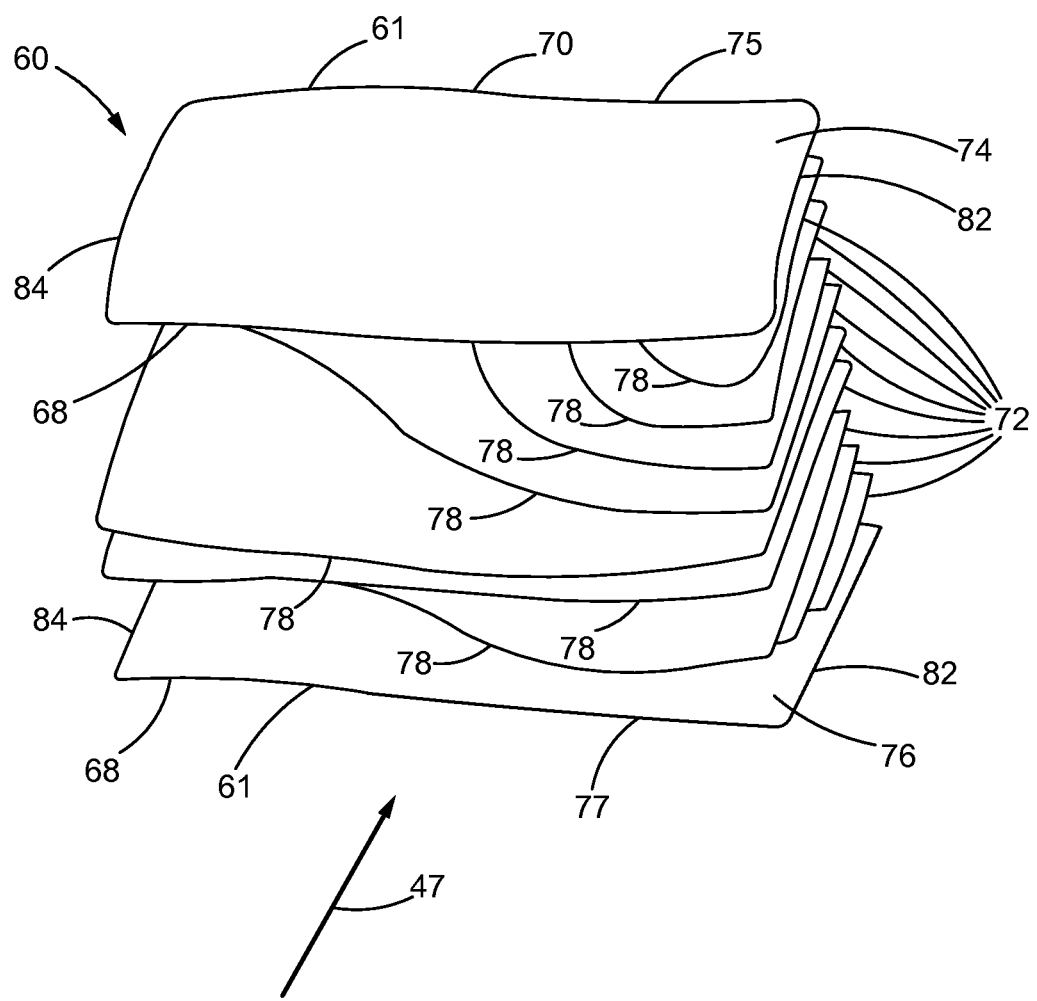
FIG. 6 is an exploded partial perspective view of the fan blade cover of FIG. 4.

FIG. 6 is an exploded perspective view of the fan blade cover 60. The cover 60 may comprise multiple inner plies 72 sandwiched (interposed) between one or more top plies 74 and one or more bottom plies 76. The top plies 74 face outward, away from the body 58, and the bottom plies 76 face inward, toward the body 58. The inner plies 72 may have varying (non-coextensive) perimeters 78 and thus varying shapes to generate the variable thickness of the cover 60, while the top and bottom plies 74, 76 may have perimeters 75, 77 that are substantially co-extensive with (have the same dimensions as) the opening perimeter 64, thereby matching the cover perimeter 61. In other words, the inner plies 72 in this example extend over only a portion of the total cover area while the top and bottom plies (i.e., the outer plies) 74, 76 extend over the entire cover area.

By varying the sizes and placement of the inner plies 72, it is possible to achieve complex variations in cover thickness. Thus, the cover thickness can be locally increased or decreased to obtain higher or lower natural frequencies of different vibration modes.

After the plies are layered up and the cover is cured to the desired shape, additional machining operations may be used to trim or additional shape the cover to the desired final dimensions.

Alternatively, the cover 60 as illustrated in FIG. 5 may comprise a dry fiber preform that is woven or braided to achieve a variable thickness, wherein topographical lines 66 illustrate variations in the cover thickness. Resin is typically introduced to the dry preform through a resin infusion process such as Resin Transfer Molding (RTM) or Vacuum Assisted Resin Transfer Molding (VARTM). Advantages of the variable thickness preform are reduced touch labor and increased through-thickness reinforcement, the latter resulting in much greater delamination resistance compared to the previously described laminated design.

It may be desirable to make the cover 60 as thin as possible to allow the cover 60 to bend or deflect in synchronization with the titanium body 58 upon foreign body impacts, thereby maintaining the bond between the cover 60 and the body 58 and, as a result, the integrity of the fan blade 14.

Preferably the cover 60 is thinnest (and most flexible) near its leading edge 68 and top edge 82 (near the fan blade tip 50) where the fan blade 14 is most likely to bend or deflect. However, the cover 60 may have any desirable configuration, including one in which the cover has thinner zones located away from the perimeter 61.

In another aspect of the disclosure a method for fabricating a fan blade 14 of a turbofan gas turbine engine 10 is provided. The method may comprise the following steps:

manufacturing a body 58 including a pressure side 52 and a suction side 54, the pressure side 52 and the suction side 54 being disposed between and connected to a fan blade leading edge 44 and a fan blade trailing edge 46, the pressure side 52 or the suction side 54 including an opening 63 communicating with one or more cavities 65 located on the pressure side 52 or the suction side 54;

providing a cover 60 configured to fit over the opening 63 and comprising a cover leading edge 68 and a cover trailing edge 70 which generally align with the fan blade leading edge 44 and trailing edge 46 respectively, the cover 90 further comprising one or more inner plies 72 sandwiched between one or more top plies 74 and one or more bottom plies 76, wherein the inner plies 72 have varying perimeters 78 and varying shapes; and covering the opening 63 with the cover 90.

In the method described above the top and bottom plies 74, 76 may have perimeters 75, 77 coextensive with the opening perimeter 64.

The method described above may include the additional step of applying a laminate to the cover 60 (in addition to or instead of using top and bottom plies 74, 76) so that the perimeters 78 of the inner plies 72 are covered in laminate, thereby providing a smooth cover 60 with no non-aerodynamic steps or drop offs.

The method described above may include the additional steps of:

positioning the one or more inner plies (72) between the one or more top plies (74) and the one or more bottom plies (76) to create a layered structure;

curing the layered structure to create cured structure; and machining the cured structure to a desired shape and finish to create the cover (60).

Thus there has been disclosed a fan blade having an opening on one side exposing one or more cavities, and a composite cover that fits over the opening. The composite cover has a variable thickness and topographical lines representing the various edges of the plies. The variable thickness of the cover, and the layering of the cover plies, is designed to achieve a lightweight fan blade having an optimal level of stiffness.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

What is claimed:

1. A fan blade comprising:

a body having a pressure side, a suction side adjoining the pressure side along a fan blade leading edge and a fan blade trailing edge, the suction side defining an opening having a perimeter;

a cover located over the opening and comprising a cover leading edge, a cover trailing edge, a cover bottom edge and a cover top edge, the cover comprising a plurality of inner plies located between an outermost ply and an innermost ply, the outermost ply and the innermost ply having an outer dimension that is the same as the perimeter of the opening and the plurality of inner plies have varying perimeters such that the cover is provided with a varying thickness in order to obtain higher or lower natural frequencies of different vibration modes; and at least one hollow cavity located within the opening between the cover and the pressure side of the body.

2. The fan blade of claim 1 wherein:

the cover is configured to bend in synchronization with the body.

3. The fan blade of claim 1 wherein:

the cover is thinnest near the cover leading edge and the cover top edge.

4. The fan blade of claim 1 wherein:

the cover is most flexible near the cover leading edge and the cover top edge.

5. The fan blade of claim 1 wherein:

each of the plurality of inner plies have a perimeter that is less than the perimeter of the opening.

6. The fan blade of claim 1 wherein:

the plurality of inner plies, the outermost ply and the innermost ply are made of a composite material layered up and cured together.

7. The fan blade of claim 1 wherein:

the cover has zones located away from the perimeter of the cover that are thinner than zones located near the perimeter of the cover.

8. The fan blade of claim 1, wherein the outermost ply is a single ply and the innermost ply is a single ply.

9. The fan blade as in claim 1, wherein the plurality of inner plies, the outermost ply and the innermost ply are formed from a carbon fiber reinforced polymer.

10. The fan blade as in claim 1, wherein the plurality of inner plies, the outermost ply and the innermost ply are formed from a glass fiber reinforced polymer.

11. The fan blade as in claim 1, wherein a protective coating is applied to the cover.

12. A method for fabricating a fan blade of a turbofan engine comprising the steps of:
   manufacturing a body including a pressure side and a suction side, the pressure side and the suction side being disposed between and connected to a fan blade leading edge and a fan blade trailing edge, one of the pressure side or the suction side including an opening communicating with one or more cavities;
   covering the opening with a cover, the cover comprising a cover leading edge, a cover bottom edge and a cover trailing edge, the cover comprising a plurality of inner plies located between an outermost ply and an innermost ply, the outermost ply and the innermost ply having an outer dimension that is the same as the perimeter of the opening and the plurality of inner plies have varying perimeters such that the cover is provided with a varying thickness in order to obtain higher or lower natural frequencies of different vibration modes; and
   wherein at least one hollow cavity is located within the opening between the cover and a pressure side or a suction side of the fan blade when the cover is covering the opening.

13. The method as in claim 12, wherein the plurality of inner plies, the outermost ply and the innermost ply are formed from a carbon fiber reinforced polymer.

14. The method as in claim 12, wherein the plurality of inner plies, the outermost ply and the innermost ply are formed from a glass fiber reinforced polymer.

15. The method as in claim 12, wherein a protective coating is applied to the cover.

* * * * *